United States Patent [19]

Kelly

[11] Patent Number: 5,020,425
[45] Date of Patent: Jun. 4, 1991

[54] SPRING ROD HINGELESS VENTILATOR

[76] Inventor: Timothy A. Kelly, P.O. Box 885, Salem, Va. 24153

[21] Appl. No.: 534,471

[22] Filed: Jun. 7, 1990

[51] Int. Cl.⁵ .............................................. B60H 1/26
[52] U.S. Cl. ..................................................... 98/2.18
[58] Field of Search ..................................... 98/2, 2.18

[56] References Cited

U.S. PATENT DOCUMENTS

| | | | |
|---|---|---|---|
| 3,102,464 | 9/1963 | Kelly et al. | 98/2.18 |
| 3,358,576 | 12/1967 | Kelly et al. | 98/2.18 |
| 3,366,027 | 1/1968 | Kelly | 98/2.18 |
| 3,372,631 | 3/1968 | Kelly | 98/2.18 |
| 3,760,707 | 9/1973 | Kelly | 98/2.18 |
| 3,839,950 | 10/1974 | Kelly et al. | 98/2.18 X |
| 4,452,129 | 6/1984 | Kelly et al. | 98/2.18 |

*Primary Examiner*—Harold Joyce
*Attorney, Agent, or Firm*—Wilmer Mechlin

[57] ABSTRACT

A hingeless ventilator having a frame attachable to a wall of a compartment about an aperture therein, an opening in the frame alignable with the aperture, a closure member swingable against a side of the frame for opening and closing the opening, guide members fixed to and instanding from an opposite side of the frame beyond opposite ends of the opening, and a spring rod mounting on opposite ends composite rollers riding on the guide members and connected under tension to the closure member for selectively positioning the closure member relative to the frame, the roller assemblies each having an antifriction bushing journalled on the spring rod and in and bonded to an elastomeric collar engaging an adjoining guide member.

5 Claims, 2 Drawing Sheets

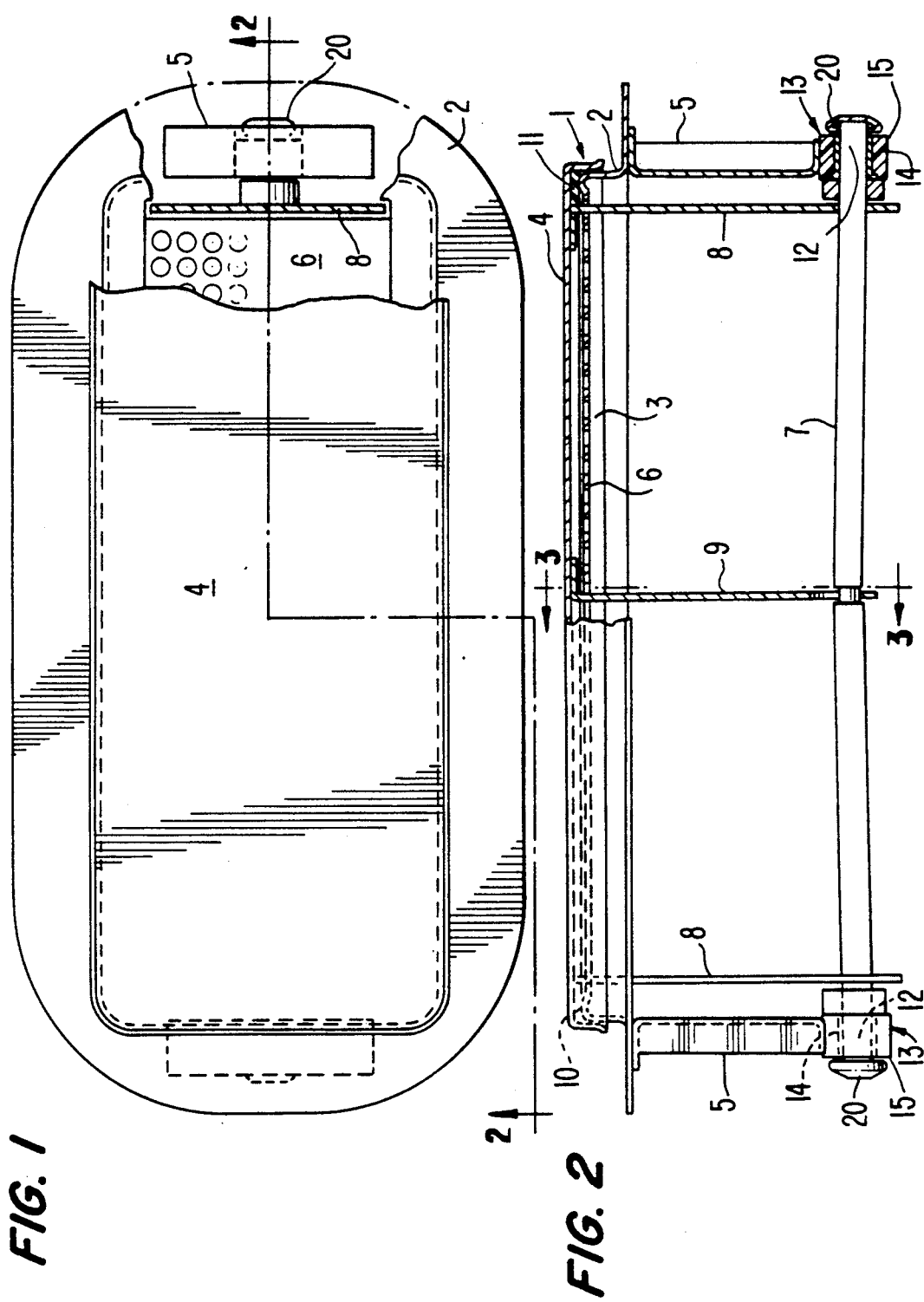

5,020,425

SPRING ROD HINGELESS VENTILATOR

BACKGROUND OF THE INVENTION

There are a number of Kelly and Kelly et al patents on hingeless ventilators particularly designed for ventilating a cab or other compartment of a vehicle. Among those patents are U.S. Pat. Nos. 3,102,464, 3,358,576, 3,839,950 and 4,452,129, all for two-way ventilators having closure members openable in one direction to draw air into and in the opposite direction to exhaust air from a vehicle compartment. In each of these patents the ventilator has a frame attachable to a wall of a vehicle compartment about an aperture therein and a corresponding opening in the frame bounded by an outturned flange. Swingable between open and closed positions against an outside of the frame, the closure member in closed position has an inturned marginal flange surrounding and overlapping the frame flange and alternately engageable with the frame flange on opposite sides of the frame opening for substantially fixing the swinging axes of the closure member.

In U.S. Pat. Nos. 3,839,950 ('950) and 4,452,129 ('129), rollers connected for movement in unison to the closure member, ride on guide members fixed to and instanding from the frame beyond opposite ends of the frame opening for selectively positioning the closure member relative to the frame. In both patents a tensile force holds the closure member against the frame, with the difference that in patent '129 the force is derived from compression of elastomeric rollers, while in patent '950 the rollers are on opposite ends of a spring rod and the tensile force is derived from connecting the rod intermediate its ends to the closure member for flexing or bowing toward the closure member.

The concern of the present invention is an improvement on the spring rod hingeless ventilator of patent '950.

SUMMARY OF THE INVENTION

The primary object of the present invention is to provide an improved hingeless ventilator having a frame, a closure member swingable relative thereto, and a spring rod flexed between guide means toward the closure member for holding said member by tension said frame, wherein for selectively positioning said closure member relative said frame said rod rotatably mounts on opposite ends composite rollers each riding on one of said guide means and formed of an inner antifriction bushing in and bonded to an outer wear-resistant elastomeric collar.

Another object of the invention is to provide an improved hingeless ventilator having a frame, an opening in said frame, guide means instanding from said frame beyond opposite ends of said opening, and a closure member swingable relative to said frame, wherein a spring rod connected intermediate ends to the closure member is flexed theretoward for holding said closure member on said frame, and the spring rod for selectively positioning said closure member relative to said frame rotatably mounts on opposite ends composite rollers each including an inner antifriction bearing engaging said rod and in and bonded to an elastomeric collar engaging one of said guide means.

A further object of the invention is to provide an improved hingeless ventilator according to either of the preceding objects, wherein the inner bearing is made of hard antifriction "NYLOTRON" and the outer collar bonded thereto is made of wear-resistant antislip elastomeric polyurethane.

The foregoing and other objects and advantages of the invention will appear hereafter in the detailed description, be particularly pointed out in the appended claims and be illustrated in the accompanying drawings, in which:

FIGURE DESCRIPTION

FIG. 1 is an outer plan view of a preferred embodiment of the improved hingeless ventilator of the present invention, with portions broken away and shown in section to more clearly illustrate certain of the details of construction;

FIG. 2 is a vertical sectional view taken along lines 2—2 of FIG. 1;

DETAILED DESCRIPTION

Figure 3:
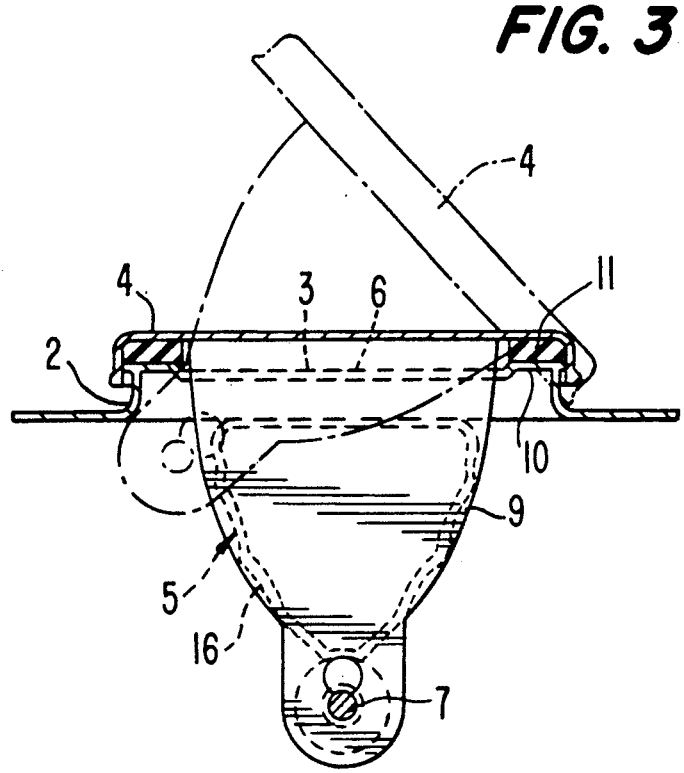
FIG. 3 is an end elevational view, partly in vertical section, taken along lines 3—3 of FIG. 2.

Referring now in detail to the drawings in which like reference characters designate like parts, the preferred spring rod hingeless ventilator of the present invention, while adapted to control the flow of air into and from a compartment, is particularly designed for ventilating a truck or tractor cab or other compartment of a vehicle by enabling air to be forced into or exhausted from the compartment through an aperture in a wall thereof while the vehicle is moving, as well as close the aperture in inclement weather, and will be so described as exemplary of the invention.

Designated as 1, the hingeless ventilator of the present invention, like the ventilator of U.S. Pat. No. 3,839,950 ('950) on which it improves, is comprised of a frame 2 attachable or securable to an exterior wall (not shown) of a vehicle cab, compartment or enclosure (not shown) about an aperture in the wall, a generally rectangular opening 3 in the frame open to the cab's interior, a closure member, cover or door 4 seatable against an outer side of and swingable on the frame for opening and closing the opening, spaced guides or guide members 5 fixed to and instanding from the inner side of the frame beyond opposite ends of the opening, a foraminous or perforated plate or sheet 6 preferably integral with the frame for screening the opening, a spring guide or control rod 7 riding at opposite ends on the guide members and connected adjacent those ends to the closure member by positioning arms 8 fixed to and instanding from the inside of the closure member adjacent opposite ends thereof, and a tensioning arm 9 fixed to the closure member for connecting the spring rod intermediate the positioning arms to the closure member and by flexing, bending or bowing the longitudinal or axial mid-portion of the spring rod outwardly toward the closure member, generating the tensile or pulling force holding the closure member on and in selected positions relative to the frame.

The preferred hingeless ventilator of the present invention and that of patent '950 not only are alike in the above respects but also in the configurations or shapes of the positioning and tensioning arms 8 and 9 and the aperturing thereof for receiving the spring rod and of the screen plate 6 for receiving the arms. The preferred likeness also extends to the provision of a continuous locating rib 10 around the screen plate 6 and a coacting gasket 11 on the closure member 4 for preventing shifting of the closure member relative to the frame 2 and consequent interference with opening and closing of the closure member in a range adjacent its closed position.

Figure 4:
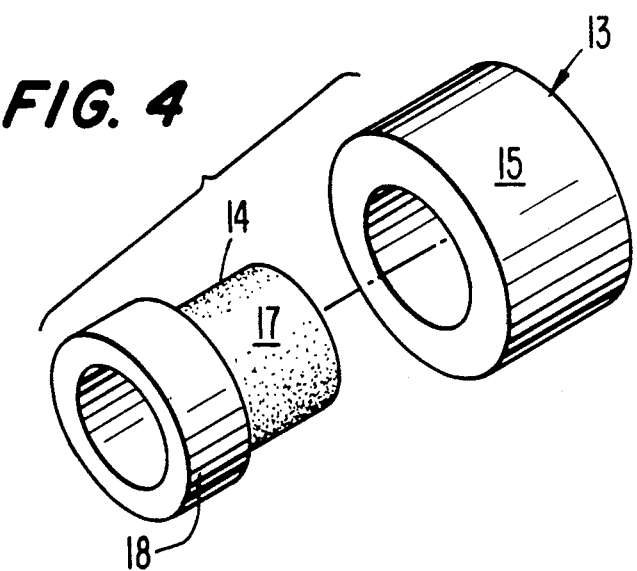
FIG. 4 is an enlarged fragmentary exploded view of a form of the composite roller in which the parts are bonded by applying an adhesive to one or both of their interfaces.
Figure 5:
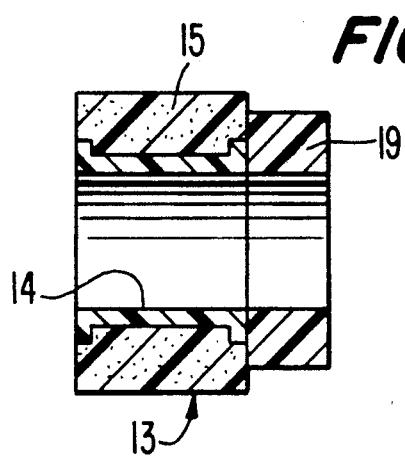
FIG. 5 is a fragmentary cross-sectional view on the scale of FIG. 4 of a form of the composite roller in which the parts are bonded by molding the outer part to the inner part.

Particularly like the embodiment of FIGS. 1-6 of U.S. Pat. No. '950 in the foregoing respects, the preferred hingeless ventilator of the present invention differs therefrom in a respect critical to the ease of operation of the ventilator. In the '950 ventilator, the spring rod mounts on opposite ends inwardly capped "Nylatron" or like anti-friction rollers through which it rides on guideways on the sides of the guide members. Problems posed by such rollers are their lack of adequate wear resistance for a service life commensurate with that of the ventilator and aggravation of the wear by their tendency to slip or slide rather than roll or turn on the guideways.

In the present invention the problems with the rollers of the '950 patent are solved by replacing its single or one part rod end rollers with composite or compound rollers 13, each comprised as an inner part or hub of an antifriction bearing or bushing 14 and as an outer part of an elastomeric, wear-resistant, non-skid or slip-resistant collar or tire 15 receiving or seating and bonded against relative rotation to the inner bushing. The inner and outer parts 14 and 15 are both annular cylindrical rollers, the inner for rotating or turning or an end 12 of the spring rod 7 and the outer for rolling on turning on an arcuately and suitably cylindrically convex guideway 16 on a side of one of the guide members 5.

As suits its intended function as a relatively stiff or hard hub or core of the composite roller 13, the inner roller or bearing 14 preferably is a "Nylatron" or like antifriction roller, while the preferred collar 15, for combining both wear- and slip-resistance, is made of polyurethane. The inside and outside diameters of the inner and outer parts 14 and 15 desirably are such that their interfit and that of the inner part and spring rod 7 are close or tight and the bond between the parts obtained by applying epoxy or other suitable adhesive to either or both of their interfaces or by molding the collar on the hub bearing, ensures against relative rotation or other relative movement of the parts of the roller 13

If the parts 14 and 15 of the composite rollers 13 are bonded by adhesive, the inner part conveniently may have a shank 17 fitting in and a cap or peripheral flange 18 inwardly of the outer part or collar. However, if the collar 15 is molded to the inner part or bearing 14, it usually will be more convenient to cap the inner part at both ends, with the caps 18 axially contained in the collar 15 and the composite roller 13 spaced from the adjoining positioning arm 8 by a separate antifriction spacer or bushing 19.

The hingeless ventilator of the present invention resembles that of Kelly et al patent '129 in preferably having open-fronted, closed-backed guides or guide members 5 drawn or stamped from sheet metal and in having roller assemblies 13 riding on the guides. The resemblance also extends to the use of polyurethane as the elastomer of which the collar 15 is composed, but the properties of the elastomer availed of in this application and patent '126 are very different. The property critical to the patent is resilience from which by compressing the collar against the guide, the patent derives the tensile force for holding the cover of the ventilator on its frame. As opposed, in this application it is the bowing or flexing of the mid-portion of the spring rod 7 toward the closure member 4 from which the tensile force is derived and the property of polyurethane critical to the improved operation of the ventilator, beyond its inherent wear-resistance, is its frictional resistance to slipping or sliding and consequent reduction in wear as it rolls rather than slides on a guide 5. The other factor critical to the present ventilator and totally absent from the roller assembly of patent '129 is the bonding of the outer collar 15 to the inner bearing 14, which by preventing relative movement and consequent distortion of the collar relative to the bearing, preserves the integrity or intactness of the composite bearing 13 and its ease of movement along a guideway 16. However their inner and outer parts 14 and 15 are bonded together, the composite rollers 13 conveniently are held on the ends of the spring rod 7 by push-on retaining caps 20.

From the above detailed description it will be apparent that there has been provided an improved hingeless ventilator which derives a tensile force for holding a cover member on a frame from bowing of a spring rod, has opposite ends of the rod riding on guide members and facilitates ease of movement of the spring rod along guideways on the guide members by mounting on each end of the rod a composite roller having as an inner part a "Nylatron" or like antifriction bearing and as an outer part a polyurethane or like wear-resistant antislip collar bonded to the bearing.

It should be understood that the described and disclosed embodiment is merely exemplary of the invention and that all modifications are intended to be included that do not depart from the spirit of the invention and the scope of the appended claims.

Having now described my invention, I claim:

1. A hingeless ventilator for ventilating a compartment through an aperture in a wall thereof, comprising a frame attachable to said wall about said aperture and having an opening alignable therewith, closure means swingable against an outside of said frame for opening and closing said opening, guide means instanding from said frame beyond opposite ends of said opening, a spring rod having ends ridable on said guide means for selectively positioning said closure means relative to said frame, means for bowing said spring rod intermediate ends thereof toward said closure means for generating a tensile force for holding said closure means in selected positions relative to said frame, and a composite roller mounted on each end of said spring rod and each rolling on a guideway of one of said guide means, each roller including an inner antifriction bearing journalled on said rod end and an antislip wear-resistant elastomeric collar bonded against relative movement to said bearing and riding on said guideway.

2. A hingeless ventilator according to claim 1, wherein the antifriction bearing is a "Nylatron" bearing and the antislip collar is a polyurethane collar.

3. A hingeless ventilator for ventilating a vehicle compartment, comprising a frame having an opening therein, closure means swingable against an outside of said frame for opening and closing said opening, guide means instanding from said frame beyond opposite ends of said opening, a spring rod riding at ends on said guide means and swingable with and bowed intermediate ends toward said closure means for holding said closure means by tension in selected positions relative to said frame, and a composite roller mounted on each end of said spring rod and each rolling on one of said guide means, each roller including an inner antifriction bearing journalled on said rod and in and bonded against relative movement to an outer antislip wear-resistant elastomeric collar.

4. A hingeless ventilator according to either of claims 1 and 2, wherein the collar is bonded by an adhesive to the bearing.

5. A hingeless ventilator according to either of claims 1 and 2, wherein the collar is bonded by molding to the bearing.

* * * * *